United States Patent Office 3,186,464
Patented June 1, 1965

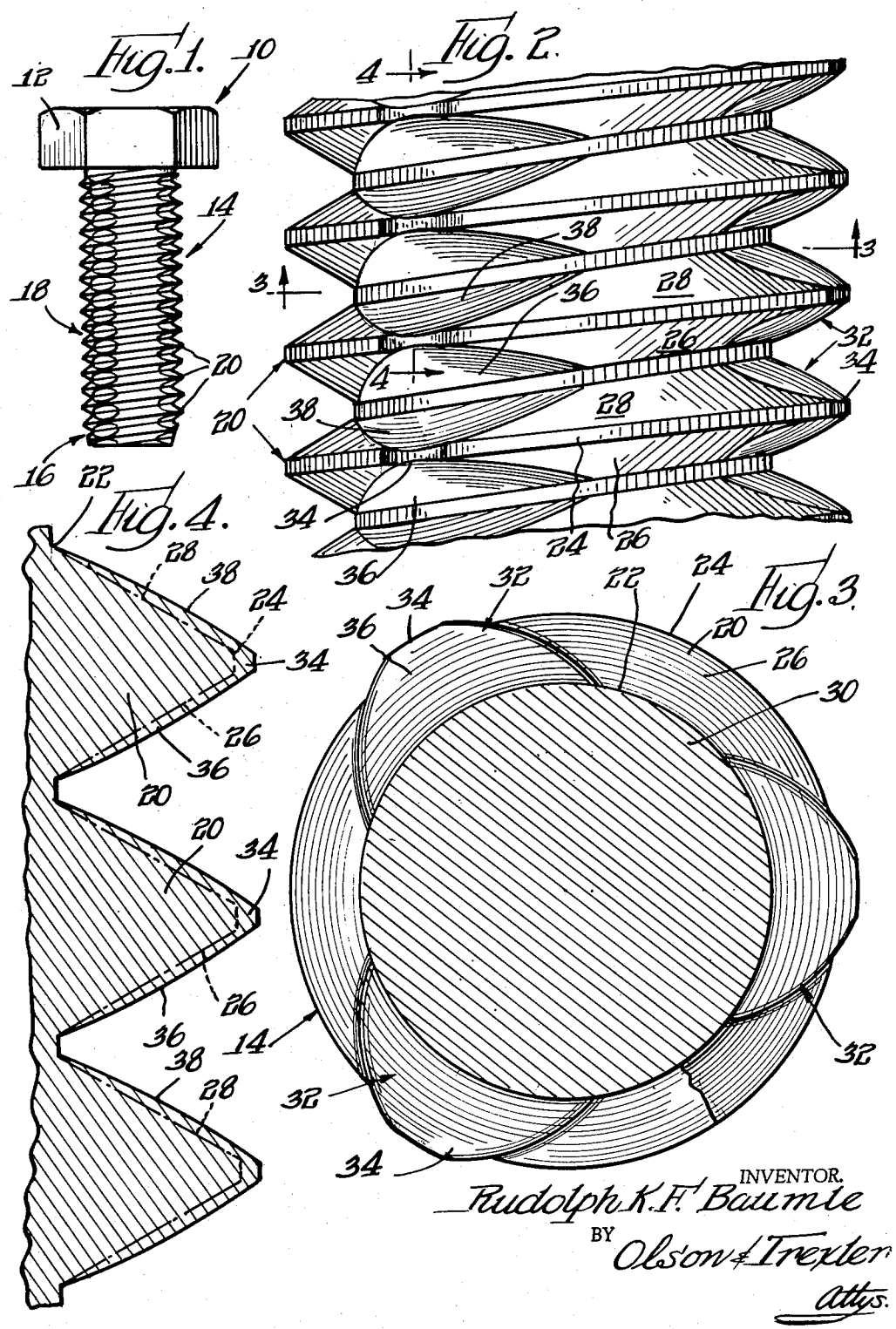

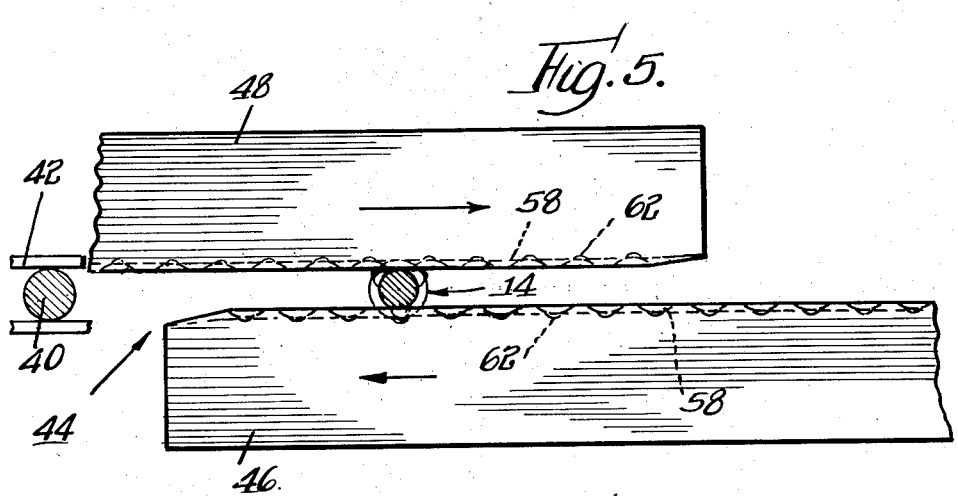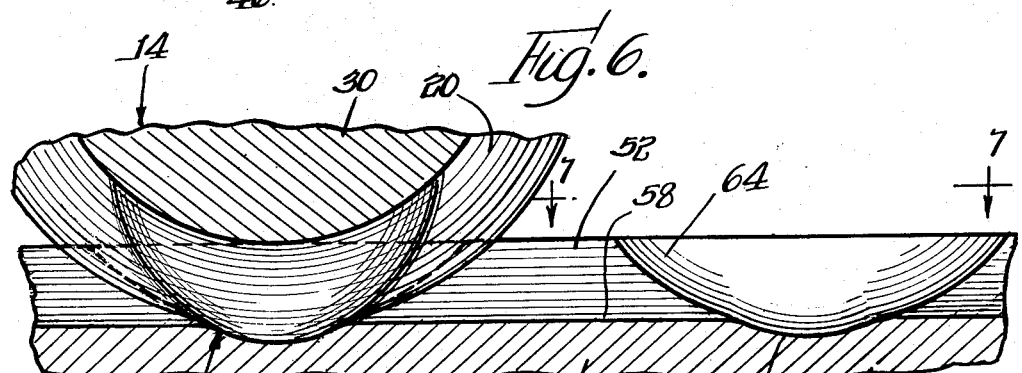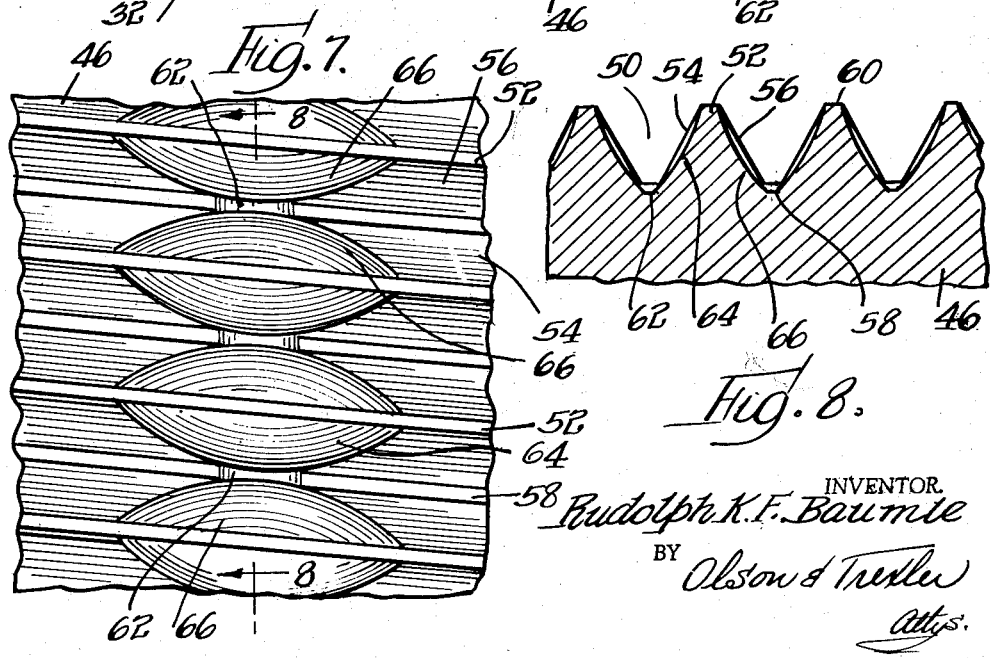

3,186,464
THREAD FORMING SCREW AND METHOD AND APPARATUS FOR MAKING THE SAME
Rudolph K. F. Baumle, Elgin, Ill., assignor to Illinois Tool Works Inc., a corporation of Delaware
Filed Apr. 3, 1961, Ser. No. 100,227
3 Claims. (151—22)

The present invention relates to a novel screw and a method and means for producing the same, and more specifically to a novel screw especially suitable for forming complementary threads in an unthreaded apertured workpiece during assembly with the workpiece.

Numerous different screws have heretofore been proposed which are capable of forming complementary threads in an unthreaded workpiece. Many of such heretofore proposed devices have been provided with thread cutting edges and others have been formed so as to cold work and shape the material of the workpiece into the complementary threads rather than to cut the workpiece material. While certain of such heretofore proposed screws have been generally satisfactory, an undesirably high amount of torque is frequently required to turn or drive them into a workpiece. Furthermore, constructions have been suggested which are relatively difficult and expensive to produce.

An important object of the present invention is to provide a novel screw especially suitable for application to an unthreaded workpiece and constructed so as to require the application of a relatively low torque thereto during assembly with the workpiece.

A further important object of the present invention is to provide a novel screw and method and means of producing the same whereby the screw may be economically manufactured while at the same time the screw is especially suitable for assembly with an unthreaded part or workpiece without requiring the application thereto of an undesirably high driving torque.

Another object of the present invention is to provide a novel screw structure of the above described type having improved resistance to loosening or unauthorized retrograde rotation.

Other objects and advantages of the present invention will become apparent from the following description and the accompanying drawing, wherein:

FIG. 1 is an elevational view showing a screw incorporating features of the present invention;

FIG. 2 is an enlarged fragmentary elevational view showing structural features of the present invention in greater detail;

FIG. 3 is a cross sectional view taken generally along line 3—3 in FIG. 2;

FIG. 4 is a further enlarged fragmentary sectional view taken along line 4—4 in FIG. 2;

FIG. 5 is a plan view showing method and means for producing the screw in accordance with the present invention;

FIG. 6 is an enlarged fragmentary sectional view showing novel features of the screw producing means or die structure in greater detail;

FIG. 7 is a fragmentary view of the die structure taken generally along line 7—7 in FIG. 6; and FIG. 8 is a fragmentary sectional view taken along line 8—8 in FIG. 7.

Referring now more specifically to the drawings wherein like parts are designated by the same numerals throughout the various figures, a screw member 10 incorporating features of the present invention is shown in FIG. 1. The screw member comprises a head portion 12 which may be of any known or desired configuration. It is to be understood however, that in certain instances screw members incorporating features of the present invention may be provided as headless studs. The screw member 10 further comprises a shank or stud section 14 extending axially from the head portion 12. The shank or stud section 14 is provided with a tapering entering end portion 16 for facilitating initial entry into a workpiece aperture, not shown, and an elongated trailing or holding portion 18.

In accordance with features of the present invention the stud or shank section 14 is provided with a plurality of helical thread convolutions 20 shown best in FIGS. 2, 3 and 4 and extending along the holding portion 18 of the shank and also the tapering entering end portion 16 as shown in FIG. 1. The thread convolutions on the tapering entering end portion 16 are formed so that they are progressively diminishing heighth toward the terminal end of the entering end portion for facilitating starting of the screw member into an unthreaded workpiece aperture. It will be appreciated that the tapering entering end portion 16 may be slotted in accordance with various known procedures or otherwise formed so as to provide a thread cutting edge thereon, not shown, or alternatively, the screw may be made in the manner shown without such a slot so that it is adapted to impress rather than cut the complementary threads in the workpiece.

As shown best in FIG. 3, the thread convolutions are formed so that, in cross section, the screw is provided with concentric root and crest circles 22 and 24 coinciding with the roots and crests of the thread convolutions 20. The diameters of the circles are uniform along the length of the holding portion 18 of the shank and progressively decrease along the tapering entering end portion 16 of the shank. Each of the thread convolutions includes opposite inclined flanks or side surfaces 26 and 28 which extend from the central cylindrical portion 30 of the screw shank defined by the root circle 22 to the crest circle 24 of the thread convolution.

In accordance with a feature of the present invention, each complete thread convolution 20 is provided with a plurality of circumferentially spaced enlargements 32. In the embodiment shown, each thread convolution is provided with three enlargements 32 equally spaced therearound. The enlargements 32 serve, during application of the screw to an unthreaded workpiece aperture, as the primary means engageable with the workpiece for forming the complementary thread therein. In other words, each of the enlargements 32 serves as a workpiece forming element and as a bearing element engageable with the workpiece for initially reducing contact between the remaining portions of the thread convolutions and the workpiece. As the result of the concentration of the workpiece forming pressures at the enlargements 32 and the reduction in initial contact between the workpiece and the remaining major surface area of the thread convolutions, the torque required to drive the screw into an unthreaded workpiece and to form the complementary threads in the workpiece is reduced.

It is to be noted that each of the enlargements 32 includes a circumferentially short outer end or tip portion 34 which projects radially beyond the crest circle 24 of the thread convolutions. Furthermore, each of the enlargements includes opposite side portions 36 and 38 bulging laterally from the flanks 26 and 28 of its associated thread convolution. As shown in FIGS. 2, 3 and 4 the side portions 36 and 38 of each enlargement are relatively thick toward the crest circle 24 and substantially taper into their associated thread convolution flanks at the root circle. Furthermore, the side portions 36 and 38 have their greatest thickness along a radius of the screw shank which bisects their associated tip portion 34, and the side portions progressively decrease in thickness in both circumferential directions from this radius until they merge into the flanks of the thread convolution. As shown best in FIG. 3, the construction is such that the circumferential extent of each of the side portions 36 and 38 along its associated thread convolution is a maximum at the root circle and progressively decreases to the circumferentially short tip portion 34. Furthermore, the construction is such that the surfaces of the side portions 36 and 38 are rounded in cross section both radially and circumferentially of the screw member. These rounded surfaces of the side portions along with the correspondingly rounded tip portions 34 serve not only as bearing and workpiece forming means in the manner described above, but also as cam surfaces adapted to form and intimately engage slight depressions in the workpiece so as to resist unauthorized loosening or retrograde rotation of the screw.

The screw member 10 is adapted to be formed quickly and economically in accordance with the process and with the aid of the means shown in FIGS. 5–8. More specifically, screw blanks 40 are successively fed along guide means 42 to a work station 44 at which they are inserted between a pair of complementary die blocks 46 and 48 constructed in accordance with features of the present invention. The die blocks are then relatively shifted with respect to each other in the direction of the arrows so that the blanks are successively rolled therebetween so as to roll the thread convolutions thereon as shown in FIG. 5. The portions of the apparatus which serve to feed the blanks 40 between the die blocks and to move the die blocks relative to each other may be constructed in accordance with various known or presently available machines and therefore need not be shown and specifically described herein. However, it is to be noted that in accordance with a feature of the present invention the screw blanks are processed so that the enlargements 32 are rolled or extruded from the blank material simultaneously with the rolling of the remainder of the thread convolutions 20.

As shown in FIGS. 6–8, each of the die blocks is formed with a plurality of thread rolling grooves and ribs 50 and 52 extending generally longitudinally and also diagonally thereof. The ribs are formed so that side surfaces or flanks 54 and 56 thereof correspond to the flanks of the thread convolutions 20. Furthermore, the heighth of the ribs or in other words the distance between the bottoms 58 of the grooves and the crests 60 of the ribs is equal to the difference between the root and crest diameters of the thread convolutions 20.

In accordance with a feature of the present invention, recesses or hollows 62 are formed in the bottoms 58 of the grooves at spaced intervals and recesses or hollows 64 and 66 are formed in the sides or flanks 54 and 56 at similarly spaced intervals and merge into the recesses 62. In other words, the recesses 62, 64 and 66 are provided in sets with the sets of these recesses spaced at predetermined intervals along the die blocks. In the embodiment shown, these sets of recesses are spaced so that three of the sets will be brought into association with the screw blank during each revolution of the blank. In other words, the spacing between the center of each set is equal to approximately one-third of the circumference of the screw blank. The shape of the hollows or recesses 62–66 is such as to provide the enlargements 32 with the construction and shape described above. Thus, the side recesses 64 and 66 are substantially elongated at the upper edges or crests 60 of the ridges with the length of the recesses at the crests of the ridges being substantially equal to the circumferential extent of the sides of the enlargements at the rods of the thread convolutions 20. The side recesses 64 and 66 gradually and progressively decrease in length and increase in depth from their opposite ends at the crests 60 toward the recesses 62 so that the enlargements will be provided with the rounded surfaces described above. With this structure, the enlargements can, as previously indicated, be quickly and easily and economically rolled on the screw blank during the rolling of the thread convolutions 20.

While the preferred embodiment of the present invention has been shown and described herein, it is obvious that many changes may be made without departing from the spirit and scope of the appended claims.

The invention is claimed as follows:

1. A metal screw adapted to be applied to an unthreaded aperture in a workpiece comprising a shank having a tapering entering end portion and an elongated holding portion, and a plurality of closely spaced helical thread convolutions integral with said shank portions, thread convolutions along said entering end portion being of progressively diminishing heighth for facilitating starting into said unthreaded aperture, said holding shank portion having a circular transverse cross section, each complete thread convolution on said holding shank portion having predetermined root and crest circles and opposite flank surfaces converging in cross section from said root circle toward said crest circle, flanks of adjacent convolutions being closely adjacent each other at said root circle, and each complete thread convolution on said holding portion including a plurality of circumferentially spaced bearing and workpiece forming enlargements for facilitating the formation of complementary threads in said unthreaded aperture, each of said enlargements projecting axially in opposite directions from said opposite flank surfaces and radially outwardly of the crest circle of its associated thread convolution, and each of said enlargements extending to said root circle and tapering substantially flush with its associated flank surface at said root circle, each of said enlargements having sides rounded both radially and circumferentially of the thread convolutions, radially outer ends of said sides of each enlargement providing a tip portion extending at least to the crest of the thread convolution, and said sides of each enlargement having a maximum circumferential extent adjacent said root circle and progressively diminishing to a minimum circumferential extent at said tip portion.

2. A screw, as defined in claim 1, wherein said enlargements are circumferentially spaced from each other at said root circle a predetermined distance and are progressively increasingly circumferentially spaced from each other radially outwardly of said root circle.

3. A screw, as defined in claim 1, wherein each of said full thread convolutions includes three of said enlargements substantially equally spaced therearound.

References Cited by the Examiner

UNITED STATES PATENTS

| | | | |
|---|---|---|---|
| 1,933,332 | 10/33 | May | 85—47 |
| 2,165,009 | 7/39 | Rosenberg | 80—9 |
| 2,278,411 | 4/42 | Braendel | 80—61 |
| 2,352,982 | 7/44 | Tomalis | 85—47 |
| 2,355,486 | 8/44 | Tinnerman | 85—46 |
| 2,581,690 | 1/52 | Moehle et al. | 151—22 |
| 2,991,491 | 7/61 | Welles | 10—152 |
| 3,027,042 | 3/62 | Graves | 151—22 |

FOREIGN PATENTS 210,236   7/60   Austria.

EDWARD C. ALLEN, *Primary Examiner.*

CARL W. TOMLIN, *Examiner.*